United States Patent [19]

Renalls

[11] Patent Number: 5,043,197
[45] Date of Patent: Aug. 27, 1991

[54] METHOD FOR MAKING BIAXIALLY-ORIENTED POLYESTER FILM HAVING A DUAL-SIDED APPEARANCE AND ARTICLE MADE THEREFROM

[75] Inventor: Brenda L. Renalls, Woodbury, Minn.

[73] Assignee: Minnesota Mining and Manufacturing Company, St. Paul, Minn.

[21] Appl. No.: 614,834

[22] Filed: Nov. 13, 1990

Related U.S. Application Data

[62] Division of Ser. No. 294,414, Jan. 6, 1989, Pat. No. 4,990,401.

[51] Int. Cl.$^5$ .................... B32B 27/36; B65D 85/84; B29C 39/00
[52] U.S. Cl. ................................. 428/36.4; 428/910; 264/299; 264/290.2; 264/337; 264/216; 206/444; 206/303; 206/313
[58] Field of Search .................... 428/403, 34.1, 143, 428/147, 480, 36.4, 910; 264/299, 290.2, 337, 216; 206/444, 303, 313

[56] References Cited

U.S. PATENT DOCUMENTS

| | | | |
|---|---|---|---|
| 3,579,609 | 5/1971 | Sevenich | 260/873 |
| 3,640,944 | 2/1972 | Seppala et al. | 260/40 |
| 4,413,298 | 11/1983 | Pecsok et al. | 360/133 |
| 4,603,073 | 8/1986 | Renalls | 428/480 |

OTHER PUBLICATIONS

American Society for Testing and Materials (ASTM), D1238-86, "Standard Test Method for Flow Rates of Thermoplastics by Extrusion Plastometer," pp. 402-410.
American Society for Testing and Materials (ASTM), D2244-79, "Standard Method for Instrumental Evaluation of Color Differences of Opaque Materials," pp. 389-397.

Primary Examiner—James J. Seidleck
Assistant Examiner—Charles R. Nold
Attorney, Agent, or Firm—Gary L. Griswold; Walter N. Kirn; Robert H. Jordan

[57] ABSTRACT

A biaxially-oriented polymer film having dual-sided appearance, i.e., the color of each side is chromatically different. Also a method for making such films.

23 Claims, No Drawings

METHOD FOR MAKING BIAXIALLY-ORIENTED POLYESTER FILM HAVING A DUAL-SIDED APPEARANCE AND ARTICLE MADE THEREFROM

CROSS-REFERENCE TO RELATED APPLICATION

This application is a division of U.S. Application Ser. No. 07/294,414, now U.S. Pat. No. 4,990,401.

FIELD OF THE INVENTION

This invention concerns a biaxially-oriented polyester film having a dual-sided appearance, i.e., different colored appearance, and a method for making same.

BACKGROUND

Biaxially-oriented polyester films, e.g., polyethylene terephthalate, are well-known for high dimensional stability, moisture resistance, tear resistance, and low cost, and have achieved substantial commercial utility. Such films are commonly used in electrical insulation, as a backing for pressure-sensitive adhesive tapes, magnetic recording tapes, or abrasives, and in many other products.

For instance, U.S. Pat. No. 4,413,298 (Pecsok et al.) discloses a jacket for magnetic recording diskettes which is made from biaxially-oriented polyester film containing particles of a different polymer, providing a matte finish that aesthetically masks scratches and smudges. The reference discloses incorporation of a pigment, e.g., carbon black, in the polyester to impart desired opacity to the film.

U.S. Pat. No. 3,579,609 (Sevenich), discloses that blending minor amounts of fusible heat-stable polymers of a lower-mono-alpha olefin (e.g., polyethylene, polypropylene, polybutylene) or tetramethylene oxide into polyester resin which is extruded into a film and thereafter oriented, imparts improved flex resistance to the resultant film.

U.S. Pat. No. 3,640,944 (Seppala et al.) discloses tape comprising a blend of 1) a major portion of polyethylene terephthalate polymer, 2) from about 1 to 30 percent by weight of a thermoplastic, high temperature, opacifying additive polymer, e.g., polysulfone and poly(4-methyl, 1-pentene), dispersed throughout the tape in discrete microscopic particles, and 3) an effective amount of a light absorbing material.

None of these references teaches that the films taught therein exhibit substantial side-to-side variation in color appearance.

SUMMARY OF INVENTION

This invention provides a novel polyester film material which is well-suited for use in magnetic recording diskette jackets or other specialized packaging needs, and also provides a method for producing such a film. One side of the polyester film material provided herein has a matte finish and thus tends to hide and minimize the effect of smudges or scratches that may be formed thereon when the film is handled, thereby maintaining an aesthetically pleasing appearance.

Of special advantage is the "dual-sided appearance" of the material. "Dual-sided appearance" is used herein to refer to the unexpected property wherein opposing sides of polyester films of the invention are of different colors, i.e., the first or matte side of the film is silver to gray in color whereas the second side of the film is dark gray in color. The descriptions of the colors, i.e., relative intensity or shades of white and black, of the two sides may be expressed objectively in terms of the Hunter Laboratory Color Scale which represents the mathematical approximation of the non-linear black-white response of the human eye. In that color measuring system, color is expressed numerically with three factors, L, $a_L$, and $b_L$, wherein L represents intensity of color on a scale of black ($-L$) to white ($+L$), $a_L$ represents color on a scale of green ($-a_L$) to red ($+a_L$), and $b_L$ represents color on a scale of blue ($-b_L$) to yellow ($+b_L$). Polyester film materials of the present invention exhibit an intensity difference or Delta L of at least about 5, typically at least about 10, and in some instances more than about 15. With the unaided eye, a typical human observer can detect color differences equivalent to a Delta E or a Delta L of about 1.0 or more.

The dual-sided appearance of such films may be used to assist in desired orientation of the film, such as during preparation, e.g., surface priming, or conversion, e.g., cutting, or when a product incorporating same is used by a consumer, or may be of special aesthetic utility in some applications, such as product packaging.

Briefly summarizing, the novel film of the invention is a biaxially-oriented monolayer film of polyester polymer containing discrete, substantially uniformly distributed polymeric particles which have an average diameter of between about 5 and about 100 micrometers and which comprise between about 5 and about percent by weight of the film, and also containing an amount of carbon black pigment sufficient to achieve desired opacity. The polymeric particles are distributed as a discontinuous phase throughout the continuous phase of polyester polymer. Carbon black may be compounded within either the polyester phase, the discrete particle phase, or in both phases. A first side of the film has a matte finish and Hunter Laboratory Color on the L Scale of between about 52 and about 67, and the other side of the film has smooth finish Hunter Laboratory Color on the L Scale of between about 38 and about 53. The difference in Hunter Laboratory Color L Scale value between Opposing sides of films of the invention, referred to herein as Delta L, is at least about 5, typically at least about 10, and in some instances more than 15.

In brief summary, the method for forming such monolayer polyester films comprises:
(A) preparing particle-forming stock from particle-forming polymer, optionally compounding the particle-forming polymer with carbon black;
(B) preparing polyester stock from polyester polymer, optionally compounding the polyester polymer with carbon black;
(C) mixing thoroughly the particle-forming stock with the polyester stock to form a casting composition;
(D) quench casting the casting composition to form a film;
(E) lengthwise orienting the film; and
(F) tentering the film;
wherein at least one of the particle-forming polymer and polyester polymer is compounded with carbon black.

DETAILED DESCRIPTION OF THE INVENTION

As described above, the method of the invention may be briefly summarized as follows:

(A) preparing particle-forming stock from particle-forming polymer, e.g., polypropylene, optionally compounding the particle-forming polymer with carbon black;

(B) preparing polyester stock from polyester polymer, optionally compounding the polyester polymer with carbon black;

(C) mixing thoroughly the particle-forming stock with an excess of the polyester stock to form a casting composition;

(D) quench casting the casting composition to form a film;

(E) lengthwise orienting the film; and (F) tentering the film;

wherein at least one of the particle-forming polymer and polyester polymer is compounded with carbon black, to yield the novel biaxially-oriented monolayer polyester film of the invention.

The composition of polyester films of the present invention is typically about as follows:

| Component | Weight Percent |
| --- | --- |
| Polyester | 60 to 96 |
| Polyolefin | 3.0 to 40 |
| Carbon Black | 0.2 to 4.0 |

The first steps of the novel process comprise: (A) preparing particle-forming stock from particle-forming polymer, such preparation optionally including compounding the particle-forming polymer with carbon black; and (B) preparing polyester stock from polyester polymer, such preparation optionally including compounding the polyester polymer with carbon black. "Particle-forming polymer" is defined herein as a polymer which, when mixed in an excess of polyester, will form discrete particles or assume a discontinuous phase within a continuous phase of the polyester. At least one of the particle-forming polymer and polyester polymer is compounded with carbon black.

Preparation of the particle-forming polymer stock may include, as necessary, such techniques as milling to improve material handling properties and control the particle size thereof, adjusting, e.g., raising, the temperature of the material to improve its handling and subsequent mixing and extrusion properties, and optional drying to improve handling properties of the final product. Preparation of the polyester stock may include similar processes.

At least one of the particle-forming polymer and polyester polymer is compounded with carbon black. Carbon black is typically compounded by milling under conditions which are determined, at least in part, by the nature of the particle-forming polymer or polyester polymer and carbon black being compounded therewith. Typically, better mixing is achieved by using a carbon black in a carrier that is compatible, i.e., miscible, in the particle-forming polymer or polyester, respectively, in which the carbon black is being compounded. Typical ratios are between about 0.5 and about 1.5 parts by weight of carbon black per about 9 to about 10 parts by weight of particle-forming polymer, or in separately compounded polyester polymer, between about 0.75 and about 1.5 parts by weight of carbon black per about 85 to about 100 parts of polyester. The amount of carbon black in a film of the invention is typically between about 0.2 and 4.0 weight percent of the total composition.

Preferred as the particle-forming polymer are polyolefins such as polypropylene and polyethylene which are readily available at reasonably low cost with melt flow rates in the desired range. Polysulfones, poly(2-methyl-1-pentene), and polycarbonates should also be useful, but typically tend to more expensive. Selection of the particle-forming polymer is made in consideration with selection of the polyester polymer such that, in the amounts provided for by the invention, the particle-forming polymer will form voids in the polyester phase. Such voiding is believed to be the result of the difference in melt viscosity at extrusion temperature between the particle-forming polymer and polyester phases. Films of the invention generally comprise between about 3 and about 40 weight percent of particle-forming polymer. Those films of the invention which contain lesser amounts of particle-forming polymer typically tend to exhibit a lesser degree of the dual-sided appearance provided herein, whereas those films of the invention which contain greater amounts of particle-forming polymer may tend to be somewhat weaker than films containing lesser amounts of such components.

The melt flow rate of the particle forming polymer, as measured according to ASTM D1238L, is preferably less than about 2.0 decigrams/minute, and more preferably less than about 1.0 decigram/minute, thereby tending to ensure that the particle-forming polymer will be in the form of discrete polymeric particles averaging at least about 5 micrometers in diameter, even after the particle-forming polymer stock and polyester stock have been vigorously mixed together. If the melt flow rate of the particle-forming polymer exceeds about 1.0 decigram/minute, it may be desirable to mix the particle-forming polymer stock and polyester stock less vigorously, especially if the intrinsic viscosity of the polyester polymer is toward the high end of the 0.4 to 1.0 range discussed to below. However, vigorous mixing is usually desirable to ensure substantially uniform dispersal of carbon black throughout the film, thereby achieving adequate and substantially uniform opacity of the resultant polyester film.

Although more vigorous mixing tends to reduce the particle size, the average particle size of the particle-forming polymer is likely to remain above about 25 micrometers if the intrinsic viscosity of the polyester is between about 0.55 and about 0.65, and the melt flow rate of the particle forming polymer is within the preferred range of about 0.4 to about 0.8 decigram/minute. An average particle size of more than about 5 micrometers will typically provide a resultant film wherein the first side thereof has a matte finish that will effectively hide scratches and smudges if the particle-forming polymer comprises at least about 10 percent by volume (about 6.7 percent by weight) of the polyester film. An average particle size of more than about 25 micrometers will typically provide a resultant film wherein the first side thereof has an effective matte finish if the particle-forming polymer comprises at least about 5 percent by volume (about 3.3 percent by weight) of the film.

The major component by amount of the resultant film is polyester, e.g., polyethylene terephthalate. The intrinsic viscosity of the polyester may be in the range of about 0.4 to about 1.0. If the intrinsic viscosity is above about 0.8, the polyester polymer may tend to be difficult to extrude and both compounding of the polyester polymer with carbon black and mixing with the particle-forming polymer may be difficult as well. If the intrinsic viscosity is below about 0.4, the resultant film may tend to be brittle and to crack when folded. Polyester terephthalate is a preferred polyester polymer because it provides excellent thermal stability, and high strength and toughness, and is readily available at reasonable cost within a preferred intrinsic viscosity range of about 0.55 to about 0.65. The film of the invention will generally comprise from about 60 to about 96 weight percent of polyester polymer.

After preparation,, the particle-forming stock and polyester stock are melted and thoroughly mixed together to yield the casting composition. Such mixing may be performed by such means as an extruder or other conventional techniques. Mixing is preferably done at a sufficiently high temperature to ensure that the polymeric components of the mixture remain in molten state. The mixture will typically be mixed at a temperature on the order of about 260° C. to about 285° C., although this will depend in part upon the properties and composition of the particular mixture being prepared.

The casting composition is then preferably filtered, e.g., by passing through a Tegra Tube Bundle Filter having sintered metal tubes, to remove from the composition or preferably break up substantially all the agglomerates or domain nodules of particle-forming polymer which are over about 60 microns in diameter. Large agglomerates or nodules of particle-forming polymers may tend to cause the extruded film to break or develop holes therein when the film is subsequently stretched during lengthwise orientation and tentering. Filtration also is believed to cause further localized mixing of the casting composition before extrusion.

After mixing and optional filtration, the molten casting composition is extruded through a die and cast upon a cooled casting wheel. The casting wheel should be cooled, preferably to a steady state, e.g., by internal cooling means such as circulated cooling water at a temperature of about 45° C. to about 55° C. to cool the cast composition to below the glass transition temperature of the polyester which is the major component of the composition, i.e., typically between about 70° C. and about 80° C. The casting composition will typically have a temperature of at least about 285° C. up to about 300° C. at the time of extrusion and casting upon the cooled casting wheel. This process is referred to herein as quench casting and is believed to be a critical element in production of novel films of the invention which exhibit the aforementioned dual-sided appearance. The side against the casting wheel, which is believed to be a substantially noncrystalline or amorphous region, is relatively darker, e.g., dark gray or black, and tends to be very smooth, and the opposing side, which is believed to have a more crystalline structure, is relatively lighter in color, e.g., silver-gray, and has a more textured surface, i.e., a matte finish, than the casting wheel side.

The desired thickness of the cast film will depend in part upon the desired use for which the resultant film is being prepared, and may be achieved by control of the process conditions under which the film is formed. Films of the invention will typically have a cast thickness of about 75 to about 90 mils, i.e., about 2 millimeters, however, depending upon the characteristics desired of the resultant film, films of the invention may be cast at thicknesses outside this range.

The casting wheel should be very smooth, preferably having a mirror finish. Furthermore, the surface of the casting wheel should be a durable material that preferably permits good heat transfer and that will not tend to adhere to the casting composition and the film being formed therefrom. Polished chrome is an example of suitable casting wheel surface material.

After quenching, the film is lengthwise oriented, i.e., in the machine direction (hereinafter "MD"), by stretching it to typically between about 2.5 and about 4.0 times its original length, typically preferably to at least about 3.5 times its original length, and passed through a tenter where it is stretched in the transverse direction, i.e., cross-machine direction (hereinafter "TD"), to typically between about 3.0 and about 4.0 times its original width. If the film is not stretched sufficiently in one of these dimensions, it may tend to have a striped appearance with stripes running perpendicularly to the direction in which the film was insufficiently stretched. The film is typically heated, e.g., by infrared lamps, to raise its temperature to slightly above its glass transition temperature during lengthwise orientation and tentering.

The final thickness of the resultant film of the invention will be determined in part by the casting thickness, degree of lengthwise stretching, and degree of tentering. For many uses, the thickness will typically be between about 6 and about 8 mils (1.5 and 2.0 millimeters.).

The prepared film is then typically wound upon itself in roll form before final processing to convert it into desired form, e.g., diskette jacket or backing film.

EXAMPLES

The invention will now be further explained by the following illustrative examples. Unless otherwise indicated, all amounts are expressed in parts by weight.

Hunter Colormetric Measurement

The color of the films prepared in each Example were determined with a SPECTROGARD 96 Colorimeter from Pacific Scientific Company in accordance with ASTM D2244-79. Delta E represents the magnitude of color difference between the two sides of the film with regard to the L, $a_L$, and $b_L$ color components. Delta L represents the magnitude of color difference with regard to the L color component.

Method of Manufacture

Except as otherwise indicated below, the samples made in the following examples were made according to the following procedure.

Polyethylene terephthalate, and carbon black in a polyethylene terephthalate carrier (i.e., "PET") were metered through an acrison in indicated amount, and fed into a 4.5 inch extruder to form polyester stock Particle-forming polymer, i.e., polypropylene, and carbon black in a polypropylene carrier (i.e., "PP") were metered through an acrison in indicated amount, fed through a 2.5 inch extruder to form particle-forming stock, and then fed into a port of the 4.5 inch extruder.

After passing through and being mixed by the extruder, the casting composition was passed through a Tegra tube bundle filter of sintered metal tubes with 60 micron openings.

The casting composition was then passed through a 25 centimeter (10 inch) wide casting die, at a temperature of about 260° C. (500° F.) onto a water-cooled chill roll or casting wheel using air impingement to aid in quenching the cast film.

The cast film was then stretched in the machine direction to the extent indicated under infrared heater banks. Following MD orientation, the film was stretched in a tenter over in the transverse direction to the indicated stretch ratio. The film was then heatset in the tenter oven.

Following the MD and TD orientation, the film was wound upon a spool into roll form for storage.

EXAMPLES 1-4

Examples 1-4 illustrate four embodiments of the invention containing different amounts of particle-forming polymer and different MD and TD stretch ratios.

TABLE I

| | Composition of Film (parts) | | | |
|---|---|---|---|---|
| | Example | | | |
| | 1 | 2 | 3 | 4 |
| Polyester | 88.2 | 88.6 | 88.6 | 88.2 |
| Polypropylene | 9.0 | 10.0 | 10.0 | 9.0 |
| Carbon Black[1] (in PET) | 0.45 | 0.23 | 0.23 | 0.45 |
| Carbon Black[1] (in PP) | 0.44 | 0.23 | 0.23 | 0.44 |
| MD Stretch Ratio | 3.5:1 | 3.5:1 | 2.8:1 | 2.8:1 |
| TD Stretch Ratio | 4.0:1 | 4.0:1 | 3.0:1 | 3.0:1 |
| Caliper (mils) | 7.5 | 7.5 | 7.5 | 7.5 |

[1]Actual amount of carbon black in indicated carrier.

TABLE II

| | Characterization of Films (Hunter Colormetric) | | | |
|---|---|---|---|---|
| | Example | | | |
| | 1 | 2 | 3 | 4 |
| L - First Side | 50.3 | 61.4 | 55.6 | 45.0 |
| Second Side | 29.4 | 43.6 | 37.1 | 26.8 |
| Delta L | 20.9 | 17.8 | 18.5 | 18.2 |

EXAMPLES 5-14

Examples 5-14 illustrate several other embodiments of the invention. The compositions and color characterization of the films in each Example are shown in Table III.

TABLE III

| | Example | | | | | | | | | |
|---|---|---|---|---|---|---|---|---|---|---|
| | 5 | 6 | 7 | 8 | 9 | 10 | 11 | 12 | 13 | 14 |
| | Composition of films (parts) | | | | | | | | | |
| Polyester | 88.4 | 95.8 | 89.6 | 89.4 | 89.2 | 91.0 | 90.6 | 90.3 | 87.5 | 88.4 |
| Polypropylene | 11.1 | 3.7 | 10.1 | 10.4 | 10.6 | 8.5 | 8.9 | 9.3 | 11.6 | 11.1 |
| Carbon Black[1] (in PET) | 0.22 | 0.22 | 0.32 | 0.16 | — | 0.52 | 0.26 | — | 0.45 | 0.22 |
| Carbon Black[1] (in PP) | 0.23 | 0.22 | — | 0.12 | 0.23 | — | 0.19 | 0.39 | 0.45 | 0.23 |
| | Characterization of Films | | | | | | | | | |
| Delta E | 11.0 | 6.4 | 13.5 | 12.5 | 12.4 | 14.7 | 14.4 | 13.3 | 15.3 | 13.3 |
| Delta L | 11.0 | 6.4 | 13.4 | 12.4 | 12.3 | 14.6 | 14.4 | 13.3 | 15.2 | 13.2 |

[1]Actual amount of carbon black in indicated carrier

In Examples 5-13 the MD Stretch Ratio was 3.5, the TD Stretch Ratio was 4.0, and the Caliper was 7.5 mils. In Example 14, the values were 2.5, 3.5, and 7.5, respectively.

The dual-sided appearance of the resultant films is illustrated by the results tabulated in Table III. The Delta E and Delta L in each Example were substantially equivalent, illustrating that the dual-sided appearance of films of the invention is essentially a variation in color on the black-to-white color axis.

COMPARATIVE EXAMPLE A

A sample of the film material disclosed in U.S. Pat. No. 3,640,944 (Seppala et al.) had a Delta L of about 0.9.

Various modifications and alterations Of this invention will become apparent to those skilled in the art without departing from the scope and spirit of this invention.

What is claimed is:

1. A method for forming a biaxially-oriented monolayer polyester film, said method comprising:
   (A) preparing particle-forming stock from particle-forming polymer, optionally compounding said particle forming polymer with carbon black;
   (B) preparing polyester stock from polyester polymer, optionally compounding said polyester polymer with carbon black;
   (C) mixing thoroughly said particle-forming stock with an excess of said polyester stock to form a casting composition;
   (D) quench casting and casting composition to form a polyester film;
   (E) lengthwise orienting said film; and
   (F) tentering said film;
   wherein at least one of said particle-forming polymer or said polyester polymer is compounded with carbon black,
   said polyester film containing discrete, substantially uniformly distributed particles of particle-forming polymer having an average diameter of about 5 to about 100 micrometers and comprising about 5 to about 30 percent by volume of the polyester film to provide a matte finish, said film comprising between about 60 and about 96 weight percent of polyester, between about 3.0 and about 40 weight percent of polymeric particles, and between about 0.2 and about 4.0 weight percent of carbon black pigment, a first side of said film having a matte finish and a Hunter Colormetric L Factor of between about 52 and about 67, and a second side of said film having a Hunter Colormetric Color L Factor of between about 38 and about 53, the Delta L between said first side and said second side being at least about 5.

2. The method of claim 1 wherein the Delta L between said first side and said second side is at least about 10.

3. The method of claim 1 wherein the Delta L between said first side and said second side is at least about 15.

4. The method of claim 1 wherein said particle-forming polymer comprises at least one of the following: polypropylene, polyethylene, polysulfone, poly(2-methyl-1-pentene), or polycarbonate.

5. The method of claim 1 wherein said particle-forming polymer has a melt flow rate of less than about 2.0 decigrams/minute.

6. The method of claim 1 wherein said particle-forming polymer has a melt flow rate of less than about 1.0 decigram/minute.

7. The method of claim 1 wherein about 0.5 to about 1.5 parts by weight of said carbon black are compounded with about 9 to about 10 parts by weight of said particle-forming polymer during said preparation of said particle-forming stock.

8. The method of claim 1 wherein said polyester polymer has an intrinsic viscosity of between about 0.4 and about 1.0.

9. The method of claim 1 wherein said polyester polymer has an intrinsic viscosity of between about 0.4 and about 0.8.

10. The method of claim 1 wherein about 0.75 to about 1.5 parts by weight of said carbon black are compounded with about 85 to about 100 parts by weight of said polyester polymer during said preparation of said polyester stock.

11. The method of claim 1 further comprising filtering said casting composition before said quench casting.

12. The method of claim 11 wherein said filtering is done using a Tegra tube bundle filter.

13. The method of claim 11 wherein said filtering removes substantially all agglomerates or particles over about 60 microns in diameter.

14. The method of claim 1 wherein said quench casting comprises casting said casting composition onto a casting wheel having cooled surface.

15. The method of claim 14 wherein said casting wheel has a mirror finish.

16. The method of claim 14 wherein said surface of said casting wheel comprises chrome.

17. The method of claim 14 wherein said casting composition has a temperature of at least about 285° C. when cast upon said casting wheel.

18. The method of claim 14 wherein said casting wheel is cooled to below about 55° C.

19. The method of claim 1 wherein lengthwise orienting said film comprises stretching said film in the machine direction to between about 250 and about 400 percent its original length.

20. The method of claim 1 wherein lengthwise orienting said film comprises stretching said film in the machine direction to at least about 350 percent its original length.

21. The method of claim 1 wherein tentering said film comprises stretching said film in the transverse direction to between about 300 and about 400 percent its original width.

22. The method of claim 1 further comprising winding said polyester film upon itself into roll form after tentering.

23. A jacket for a magnetic recording diskette made from a biaxially-oriented monolayer film of polyester containing discrete, substantially uniformly distributed particles of particle-forming polymer having an average diameter of about 5 to about 100 micrometers and comprising about 5 to about 30 percent by volume of said film to provide a matte finish, and comprising between about 60 and about 96 weight percent of polyester, between about 3.0 and about 40 weight percent of polymeric particles, and between about 0.2 and about 4.0 weight percent of carbon black pigment, wherein a first side of said film has a matte finish and a Hunter Colormetric L Factor of between about 52 and about 67, and a second side of said film has a Hunter Colormetric Color L Factor of between about 38 and about 53, the Delta L between said first side and said second side being at least about 5.

* * * * *

UNITED STATES PATENT AND TRADEMARK OFFICE
CERTIFICATE OF CORRECTION

PATENT NO. : 5,043,197

DATED : August 27, 1991

INVENTOR(S) : Brenda L. Renalls

It is certified that error appears in the above-identified patent and that said Letters Patent is hereby corrected as shown below:

In Col. 2, Line 32, insert --30-- between the words "about" and "percent".

In Col. 2, Line 45, the word "Opposing" should read --opposing--.

In Col. 4, Line 27, insert a hyphen between the words "particle" and "forming".

In Col. 4, Line 52, insert a hyphen between the words "particle" and "forming".

In Col. 6, Line 59, insert a period after the word "stock".

UNITED STATES PATENT AND TRADEMARK OFFICE
CERTIFICATE OF CORRECTION

PATENT NO. : 5,043,197

DATED : August 27, 1991

INVENTOR(S) : Brenda L. Renalls

It is certified that error appears in the above-identified patent and that said Letters Patent is hereby corrected as shown below:

In Col. 8, Line 24, between the two words "casting", delete the word "and" and insert the word --said--.

Signed and Sealed this

Twenty-third Day of February, 1993

Attest:

STEPHEN G. KUNIN

Attesting Officer

Acting Commissioner of Patents and Trademarks